(12) United States Patent
Johnson et al.

(10) Patent No.: US 7,351,672 B2
(45) Date of Patent: Apr. 1, 2008

(54) CONVERTIBLE TOP FABRIC

(75) Inventors: Albert E. Johnson, Burlington, NC (US); John B. Coates, Anderson, SC (US)

(73) Assignee: Glen Raven, Inc., Glen Raven, NC (US)

( * ) Notice: Subject to any disclaimer, the term of this patent is extended or adjusted under 35 U.S.C. 154(b) by 0 days.

(21) Appl. No.: 10/051,881

(22) Filed: Jan. 18, 2002

(65) Prior Publication Data
US 2003/0139109 A1    Jul. 24, 2003

(51) Int. Cl.
B32B 27/02 (2006.01)
B32B 27/04 (2006.01)
B32B 27/12 (2006.01)
D03D 25/00 (2006.01)
B60J 7/00 (2006.01)

(52) U.S. Cl. .............. 442/261; 296/136.01; 296/136.1; 296/136.11; 296/136.13; 296/107.01; 296/210; 442/187; 442/239; 442/243; 442/255; 428/378

(58) Field of Classification Search ............... 442/187, 442/188, 189, 199, 200, 208, 239, 243, 286–294, 442/255, 261; 296/225, 136.01, 136.1, 136.11, 296/210–216.09, 136.13, 107.01; 428/378
See application file for complete search history.

(56) References Cited

U.S. PATENT DOCUMENTS 2,857,654 A * 10/1958 Sexton ...................... 442/206
2,942,327 A * 6/1960 Corry ......................... 442/203
4,295,235 A * 10/1981 Deitz ............................. 5/652
4,526,828 A * 7/1985 Fogt et al. .................... 442/19
4,996,100 A    2/1991 Druckman
5,147,713 A    9/1992 Dalbec et al.
5,385,774 A    1/1995 Cramer et al.
5,431,979 A * 7/1995 Dellinger et al. ........... 428/101
5,632,844 A * 5/1997 Pate et al. ................... 156/290
5,733,620 A * 3/1998 Baader et al. ............... 428/605
5,851,934 A * 12/1998 Lehnert ....................... 442/288
6,033,007 A    3/2000 Hirschvogel et al.
6,539,898 B2 * 4/2003 Gatto ........................... 119/850
6,557,590 B2 * 5/2003 Swers et al. ............. 139/420 A
6,871,898 B2 * 3/2005 Jarrad et al. ........... 296/107.01

FOREIGN PATENT DOCUMENTS

EP    569955 A2 * 11/1993
EP    873896 B1 *  6/2001
GB   1374223 A  * 11/1974

* cited by examiner

Primary Examiner—Elizabeth M. Cole
Assistant Examiner—Jennifer A Chriss
(74) Attorney, Agent, or Firm—Womble Carlyle Sandridge & Rice, PLLC; C. Robert Rhodes

(57) ABSTRACT

A convertible roofing material which includes an outer fabric layer formed at least partially of polymeric coated, core yarns such as a polyester core coated with polyvinyl chloride.

8 Claims, 1 Drawing Sheet

CONVERTIBLE TOP FABRIC

FIELD OF THE INVENTION

The present invention is directed to convertible top fabrics, and more specifically to a convertible top fabric which has advantages in appearance, weatherability, cleanability, sound insulation, and resistance to abrasion.

BACKGROUND OF THE INVENTION

Convertible tops in the past have been made from fabrics such as 100% cotton. These fabrics simply did not hold up for long periods of time. Thus, the term "rag top" evolved. Advantages have been obtained by using synthetic or polymeric yarns in the fabric, however, for the most part, there are unresolved problems with cleanability, appearance, and the like.

Several solutions have been offered, most of which provide some type of coating on top of the fabric. For example, in the Dalbec et al. U.S. Pat. Nos. 5,147,713 and 5,324,577, a single ply convertible top formed of a polyester and cotton fabric coated with a polyvinyl chloride coating. Similarly, in the U.S. Pat. No. 5,385,774 to Cramer et al., a convertible roof material includes a lower fabric layer (headliner) formed of one of several types of synthetic yarns and an upper layer formed of polyacrylonitrile yarns. The upper layer is dip coated with a florine-containing polymer such as tetrafluoroethylene. Such improvements suffer from a severe disadvantage in appearance, in that they do not retain a defined weave appearance in the outer layer.

SUMMARY OF THE PRESENT INVENTION

The present invention, therefore, is directed to the broad concept of an improved convertible top fabric which exhibits a woven design appearance, while at the same time provides improved weatherability, cleanability, insulation to sound and resistance to abrasion. This is accomplished by providing a fabric for the outer layer that is formed, to a significant extent (at least 25%) of polymeric clad or shielded yarn. The "coated yarn" may make up 100% of the fabric, it may be used in the warp alone or along with other softer yarns, the fill alone or along with other softer yarns, or in the warp and the fill alone or along with other softer effect yarns. These yarns improve appearance because they give a carbon fiber look. They improve weatherability and resistance to abrasion because they have a harder surface. They improve cleanability because they do not absorb dirt and oil. The sound insulation occurs because these yarns are heavier and thicker.

The outer layer of fabric is then combined with a headliner or interior layer of fabric which may be a conventional headliner fabric. The outer layer and inner layer are connected by an adhesive waterproof interlayer.

This convertible top fabric, which is in reality a laminate, then provides an extremely attractive convertible top that retains the different weave appearance, provides superior weatherability, a much more cleanable surface to the extent a white top can be made with woven fabric, is significantly quieter from exterior sound, and an improved abrasion resistance, which is one of the major reasons for failure of convertible tops.

It is therefore an aspect of this invention to provide a convertible top with a defined weave appearance, yet which is quieter, retains good characteristics of weatherability, cleanability and resistance to abrasion.

Other aspects and a fuller understanding of the invention will become apparent from the following detailed description of a preferred embodiment along with the accompanying drawings in which:

DETAILED DESCRIPTION OF PREFERRED EMBODIMENTS

Figure 1:
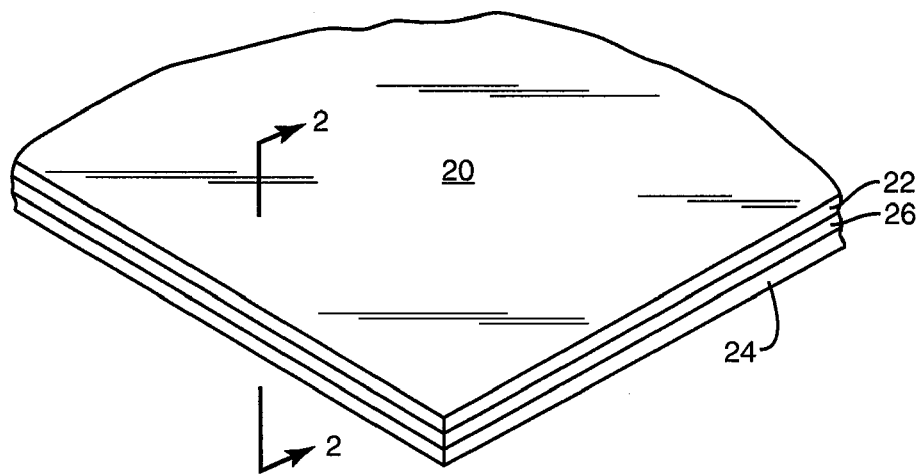
FIG. 1 is a partial schematic perspective of the convertible top fabric according to the present invention.

Turning now to a description of the preferred embodiments, as stated hereinabove, the invention herein lies in a new convertible top fabric illustrated at 20 in FIG. 1, which includes an outer or upper fabric layer 22 formed at least partially of polymeric coated core yarns; a conventionally formed inner lining 24, and a connecting layer 26 of a waterproof adhesive material, which connects the outer layer 22 and inner layer 24.

The heart of the invention lies in the makeup of outer layer 22 which, as previously stated, is at least partially formed of polymeric coated core yarns, sometimes referred to as a composite yarn. The coated yarns 30 (FIG. 2) should make up at least 25% by weight of the outer fabric, although these yarns 30 (sometimes referred to herein as "specialty yarns") could make up as much as 100% of the content of the outer layer. The remaining yarn 40 (sometimes referred to as "effect" yarn) in the outer layer is some conventional type of yarn utilized in convertible tops, typically such as acrylic, modacrylics, polypropylene, polyethylene, and one of various polyesters.

The specialty yarn, or the polymeric coated yarn is preferably a polyester core coated with an extruded polyvinyl chloride coating. Such yarns are presently available from Twitchell Corporation of Dothan, Ala., Pfeiffer Corporation of Tuscaloosa, Ala., and Engineered Yarns of Coventry, R.I. The makeup of coated yarn 30 is such that the core can range from a denier of 70 to 1200 while the denier of the coated yarn can range from a denier of 500-3500. In addition to polyester, other fibers or filaments for the core may be selected from the group of nylon, acrylic, fiberglass, aramids, olefins, and carbon fiber. In addition to the polyvinyl chloride, other resins which may be used to clad the core yarn are nylon, olefins or thermoplastic olefin elastomers, urethane, EVA, polyester, ionomers, polyphenylene sulfide, polyethersulfone, fluoropolymer, polyethertone, and liquid crystal polymers.

The coated yarns generally are known and currently manufactured for other purposes. They are formed by threading a core yarn through a defined size opening as molten polymer exits an extruder therearound. The coated yarn is then cooled by water and wound on a package.

The headliner or inner lining 26 is a fabric conventionally formed of polyester, cotton, or some combination of cotton/polyester. While it is not believed that other fibers are currently being used for headliners, it is entirely conceivable that other fibers could be used. The headliner fabric is generally woven, but it could possibly be non-woven or knitted.

The connecting layer 24 serves to both adhere the outer and interior headliner together, as well as to make the entire fabric 20 waterproof. Materials currently being used for this layer are rubber and thermoplastic olefins (TPO or TPE). Urethane adhesive technology could also be used, but is not currently used to adhere inner and outer layers of convertible tops currently being made. The rubber or olefin is extrusion coated or spread coated onto the underside of the outer layer 22 as it is an inverted position. The inner lining 26 is then applied and the outer and inner linings with the connecting layer 24 therebetween are fed through pressure rollers as the connecting layer dries.

Figure 2:
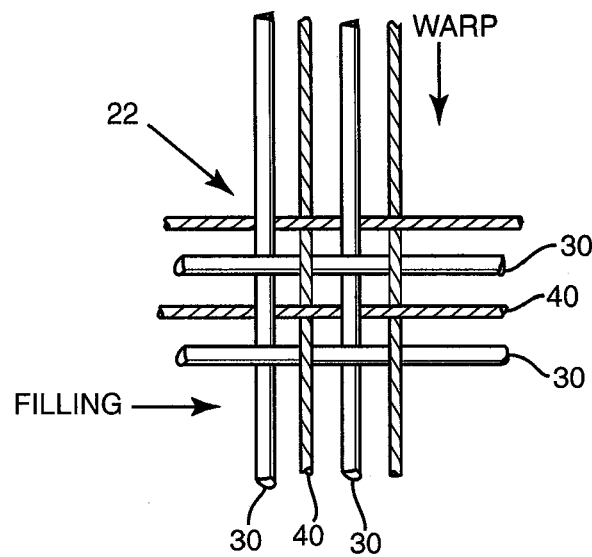
FIG. 2 is a schematic representation of a typical weave pattern of special yarns and effect yarns.

As illustrated in FIG. 2, in the construction of the outer fabric 22, the fabric is preferably woven, however some types of knit construction might conceivably be available. In a preferred form, the coated yarns 30 and effect yarns 40 are alternated in both the warp and fill as illustrated in FIG. 2. However, it should be recognized that many variations of this weave design are available. For example, the coated yarns could be introduced into the warp alone, into the fill alone, or the coated yarns could make up all yarns in the warp and fill. The only requirement believed necessary is that there be at least 25% of the total weight of the coated yarn.

Figure 3:
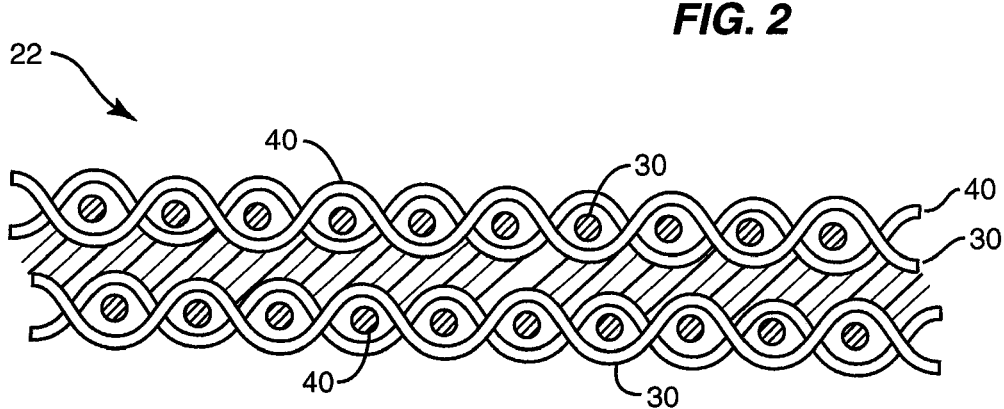
FIG. 3 is a sectional view taken substantially along lines 3-3 in FIG. 1 illustrating the various layers in the laminate.

As shown best in FIG. 3, an embodiment of the final convertible top fabric 20 as illustrated in FIG. 2 of the present invention comprises an outer fabric layer 22 formed of discrete specialty yarns 30 and effect yarns 40.

In the following table, various sizes of the coated yarn are illustrated:

| EXAMPLE | DENIER OF CORE YARN | TOTAL DENIER |
|---|---|---|
| 1 | The core yarn is 70-100 denier polyester coated with polyvinyl chloride | 600-700 |
| 2 | The core denier is 220 denier polyester coated with polyvinyl chloride | 1500 |
| 3 | The core denier is 500 denier polyester coated with polyvinyl chloride | 2035 |
| 4 | The core denier is 1000 denier polyester coated with polyvinyl chloride | 3175 |

In the fabric illustrated in FIG. 2 they warp includes alternating warp yarns of the Example 1 coated yarns and 650 denier air jet textured Black solution dyed polyester. The warp yarns are introduced in the range of 20-80 yarns per inch, preferably about 60. The fill yarns are also alternating yarns of the same type as described with respect to the warp, except they are introduced in the range of 18-50 picks per inch, preferably about 34.

In a second fabric construction the warp yarns are all 650 denier air jet textured Black solution dyed polyester introduced at 60 ends (45-80) per inch. The fill yarns are all of the coated type introduced at 34 picks per inch (18-50). The fill yarns are 220 denier polyester coated with polyvinyl chloride of the type described in Example 2 above. Alternating fill yarns have a different color coating for aesthetic purposes.

A third fabric construction includes warp yarns which are all 300 denier air jet textured Black solution dyed polyester introduced at 60 ends (45-100) per inch. The fill yarns are all coated yarns of Example 2 (pearly platinum color) introduced at 40 (18-50) picks per inch.

A fourth fabric construction includes warp yarns which are all 18/2 solution dyed black acrylic introduced at 60 (45-100) ends per inch. The fill yarns are all coated yarns of Example 2 (pearly platinum color) introduced at 40 (18-50) picks per inch.

A fifth fabric construction includes warp yarns which are all coated yarns of Example 2 (white color) introduced at 66 (20-70) yarns per inch. The fill yarns are also all coated yarns of Example 2 (white color) introduced at 30 (18-50) picks per inch.

Obviously, the yarns per inch in the warp and in the fill may vary depending on the weight of the fabric wanted and the denier of yarns required. While the denier of the effect yarn may vary widely from the denier of the coated yarns, in the preferable embodiments, it is believed that the effect yarns and the coated yarns should be approximately the same size or weight.

As previously stated, it is believed that the convertible roofing material of the present invention exhibits advantages in the areas of visual appearance, abrasion resistance, sunlight/UV resistance, cleanability and reduction of noise. Visual appearance is primarily a choice of the purchaser. The cleaner appearance of the fabrics of the present invention have aroused considerable interest in automobile manufacturers and is one of the primary factors for using this product. The product exhibits a substantially cleaner and more pleasing appearance. As far as noise reduction is concerned, the fabric of the present invention has exhibited a reduction of 1-2 decibels in the transmission of noise therethrough versus the current acrylic fabric. Other criteria for product acceptance include the ability to maintain original color and physical integrity for many years of exposure to UV or sunlight. Secondly, since the convertible top folds on itself and is stored when the top is down in a very confined space, it must have excellent abrasion resistance from fabric to fabric rubbing. Thirdly, the top is exposed to considerable dirt, soiling agents, and the like in use and must be cleanable to its original appearance over many cleaning cycles. The following examples are evidence of how the product according to the present invention meets or exceeds current testing criteria in these three critical areas.

First of all, as to the testing for sunlight or UV resistance, the test are conducted according to SAE J1960. While J1960 requirements differ from one vehicle manufacturer to another, generally passing the J1960 testing exposure of 1140KJ means that the fabric must not fade to a DeltaE of greater than 3 tested by optical color computer or decrease the tensil strength less than 50% of the original tensil strength. In the above samples, when the polyvinylchloride coated yarns (hereinafter referred to as "vinyl") were used in both the warp and fill or when the vinyl yarns were used in the warp solution dyed acrylic was in the fill, it exhibited a DeltaE of 1.5 or less while maintaining a tensil strength of at least 75%. However, when the vinyl warp was combined with a filament solution dyed polyester fill, while the DeltaE remained less than 1.5, the tensil strength in the polyester direction was only 59% of the original. Even when the vinyl/vinyl and vinyl/acrylic combinations were exposed at 1500KJ, both samples test at a DeltaE of 2 or less and maintain above a 70% level of original tensil strength. This exhibits very good sunlight/UV resistance.

The second criteria is abrasion resistance which is tested industry wide by Martindale Abrasion Testing Method ASTMD496698. Martindale testing may be used to evaluate the difference between the weight of the fabric before and after testing or to measure the difference in appearance (change in shade) before and after testing. Obviously the test sample is subjected to abrasion. Each automobile manufacturer has a different pass/fail criteria depending on how tightly the convertible top is compacted into the automobile well when the top is down. Tests pass/fail very greatly from less than 15,000 Martindale cycles on some automobiles to more than 100,000 cycles on some expensive European models where the top is very tightly packed in the down position. To achieve the 100,000+cycles, a topical additive is applied to help lubricate during the abrasion. The additive actually may be extricated early in the life cycle of the topping fabric in a washing/cleaning operation. The Martindale testing is done without topical additives. Comparisons of various products are set forth in the following table:

| | |
|---|---|
| 100% solution dyed acrylics (previous product) | 50,000 cycles pass |
| Vinyl warp/vinyl fill | 70,000 cycles pass |
| Vinyl warp/polyester filament fill | 80,000 cycles pass |
| Vinyl warp/acrylic fill | 70,000 cycles pass |

All samples in the above test pass at 100,000 cycles with various topical additives.

The third test is cleanability. The soil test generally used is the Ford Cleanability Procedure PN12-1 and PN112-08. In this test a fabric sample is soiled by a consistent method and then the fabric is cleaned. The fabric is scanned by colorimeter both before soiling, while soiled and after cleaning. The scan provides a reading. Colorimeter readings are compared before soiling and after cleaning. The vinyl/vinyl fabric exhibited a substantially superior cleaning result over the conventional acrylic/acrylic fabric.

While preferred embodiments of the invention have been described hereinabove, it is apparent other changes and modifications might be made without departing from the scope of the invention which is set forth in the accompanying claims.

We claim:

1. A roofing material for automobiles, comprising:
   (a) an outer woven fabric layer having an inner surface and an outer surface and formed of at least 50% by weight of discrete polymeric coated specialty yarns and other discrete non-coated effect yarns, the outer fabric layer having an outer surface and an inner-surface, wherein:
      (i) the specialty yarns are formed of a core yarn having a denier between 70-1200 and are covered by a polymeric coating, and the denier of the specialty yarns ranges from 500-3500;
      (ii) the discrete specialty yarns and effect yarns are maintained intact in the woven fabric in the final roofing material;
   (b) an inner fabric layer formed of non-coated yarns, the inner fabric layer having an inner surface adjacent to the inner surface of the outer fabric layer; and
   (c) an adhesive waterproofing layer, the waterproofing layer extending across the entire inner surface area of the outer layer and bonding the inner surface of the outer layer to the inner surface area of the inner layer and thereby making the roofing material waterproof.

2. The roofing material according to claim 1 wherein said core yarn is selected from the group consisting of polyester, nylon, acrylic, fiberglass, aramids, olefins, and carbon fibers.

3. The roofing material according to claim 2 wherein said polymeric coating is selected from the group consisting of polyvinyl chloride, nylon, olefins, thermoplastic olefin elastomers, urethane, EVA, polyester, ionomer, polyphenylene sulfide, polyethersulfone, fluoropolymer, polyethertone, and liquid crystal polymers.

4. The roofing material according to claim 3 wherein said coating is polyvinyl chloride and the core yarn is polyester.

5. The roofing material according to claim 1 wherein effect yarns are selected from the group consisting of acrylics, modacrylics, polypropylene, polyethylene, and polyester.

6. The roofing material according to claim 1 wherein said coated yarn is introduced in the warp alone.

7. The roofing material according to claim 1 wherein said coated yarn is introduced in the fill alone.

8. The roofing material according to claim 1 wherein said coated yarn is introduced in both the warp and the fill in a pattern alternating with effect yarns.

* * * * *